United States Patent
Delignieres et al.

[15] 3,671,723
[45] June 20, 1972

[54] DEVICE FOR COORDINATE CONVERSIONS

[72] Inventors: Robert Delignieres, Colombes; Jean-Francois Therond, Neuilly, both of France

[73] Assignee: Institut Francais du Petrole des Carburants et Lubrifiants, Rucil Malmaison (Hauts de Seine), France

[22] Filed: Oct. 2, 1970

[21] Appl. No.: 77,588

[30] Foreign Application Priority Data

Oct. 2, 1969 France..................................6933777

[52] U.S. Cl.......................................................235/150.27
[51] Int. Cl........................................................G06f 15/50
[58] Field of Search............................................235/150.27

[56] References Cited
UNITED STATES PATENTS

3,368,217  2/1968  Musso............................235/150.27 X
3,462,586  8/1969  Tholey et al......................235/150.27

Primary Examiner—Malcolm A. Morrison
Assistant Examiner—R. Stephen Dildine, Jr.
Attorney—Craig, Antonelli, Stewart & Hill

[57] ABSTRACT

This invention relates to a coordinate converting device for the determination of the coordinates of a moving body with respect to a couple of stationary axes, the values of the distance increments during its displacement, with respect to a couple of axes related to the moving body being known, comprising means for sensing the value of the angle between one of the stationary axes and the corresponding related axis and means for accumulating the values of said distance increments and determining therefrom the travel path of the moving body with respect to said stationary axes.

6 Claims, 11 Drawing Figures

INVENTORS
JEAN-FRANCOIS THERON
ROBERT DELIGNIERES

BY Craig, Antonelli, Stewart & H

ATTORNEYS

INVENTORS
JEAN-FRANCOIS THEROND
ROBERT DELIGNIERS

BY Craig, Antonelli, Stewart & Hill
ATTORNEYS

DEVICE FOR COORDINATE CONVERSIONS

This invention relates to a device for carrying out in a binary digital form, coordinate conversions, particularly required for identifying the location of a moving body with respect to stationary coordinate axes, its displacement with respect to a system of axes associated to said moving body being known. This invention has also for an object a digital computing device for performing the conversion.

The device according to the invention is particularly suitable for identifying the location of a moving body when the displacements of the latter with respect to its own coordinates axes are given in the form of distance increments.

The digital computer forming the device may be in particular used on a marine craft and associated with a navigation apparatus of the so-called "odometer" type, making use of the Doppler effect, the basic principle of which will be briefly discussed.

Acoustic waves are transmitted in an oblique direction with respect to the vertical line passing through the moving body, e.g. in the longitudinal or transversal plane. There is measured the phase shift between the transmitted waves and the waves received after back reflection from the bottom of the water body, making use of the Doppler effect.

The navigation apparatus is associated with a device for converting these phase shifts, proportional to the distance travelled by the moving body and determined, with respect to a couple of axes associated thereto, in the form of distance increments counted by counters. The navigation apparatus thus provides, in a digital form, the distances travelled by the moving body.

The displacement information thus provided by this navigation apparatus is however generally of no help when it is desired to define or follow a given course.

For such a use a coordinate digital converter has to be associated with the navigation apparatus in order to define the travelling path of the moving body with respect to a stationary axes system.

Among devices known for performing such coordinate conversions are those described in the U.S. Pat. No. 3,272,972. This patent relates to a device for determining the acceleration, the speed or the distance travelled by a moving body with respect to a reference system of spatial coordinate axes, knowing the angular variations of the attitude of the moving body with respect to said axes as well as its acceleration components in a system of coordinate axes associated with said moving body. This device is particularly suitable for determining the travel path of an aerial moving body and recording all of its variations with a high accuracy.

It is, however, very expensive, due to its complexity, and is not adapted for carrying out, for example, the coordinate conversion in the case of a marine craft subjected to rolling and pitching movements which may be detrimental to the determination of its travel path.

It is an object of this invention to provide a device for coordinate conversion particularly adapted to the determination of the travel path of a vessel with respect to stationary axes, which furthermore offers the advantage of being not expensive and which can be made substantially insensitive to the motions of its carrying medium.

The invention consists of a coordinate conversion device for determining the coordinates of a moving body, the value of the angle formed between one of the stationary axes and one of the coordinate axes associated with said moving body and also the distance travelled by the moving body and also the distance travelled by the moving body along at least one of the coordinate axes associated therewith being known, said distance being expressed in the form of cumulative distance increments. It comprises means for calculating the sine and cosine of the angle from the variations thereof. This means comprises two binary incremental computers associated in a closed circuit, the outputs of one computer being connected to the inputs of the other one and vice-versa. This device is remarkable in that it comprises means for coding in a digital form the value of the angle, means for temporarily blocking the digital value of the angle, means for summing pulses recurring at a regular period, means for sensing the equality between the digital value of the angle and the accumulated member of pulses, means for producing pulses at time intervals proportional to the regular periods, up to the detection of the equality, said pulses corresponding to angular increments, and means for calibrating said angular increments over the length of the regular periods, connected to the means for calculating the sine and cosine values of the angle. It further comprises a binary incremental computer for memorizing successive values of the angle sine and cosine at the end of each regular period, at least two binary incremental computers for effecting the product of the memorized values of the angle sine and cosine by the distance increments, calibrated over a time interval equal to the length of said regular periods, and synchronization means for the sequential control of the operations.

The calculation method used in the device and a nonlimitative embodiment thereof will be now described with reference to the accompanying drawings wherein.

Figure 2:
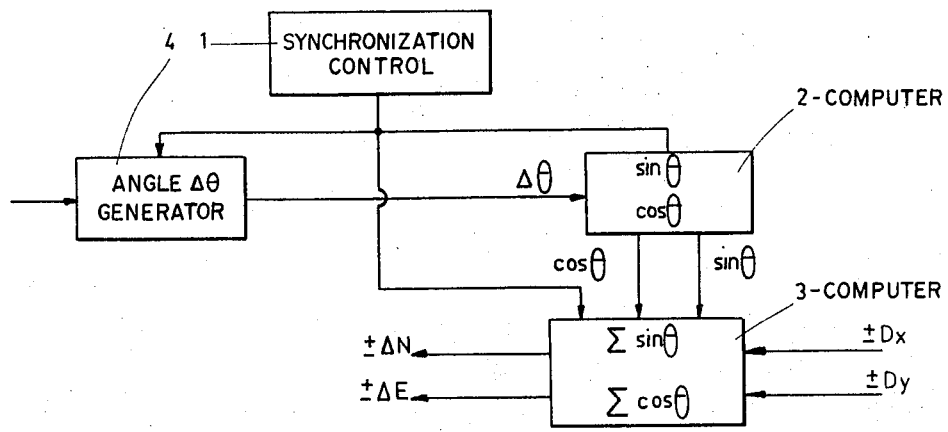

FIG. 2 diagrammatically shows the device as a whole.

Figure 3:
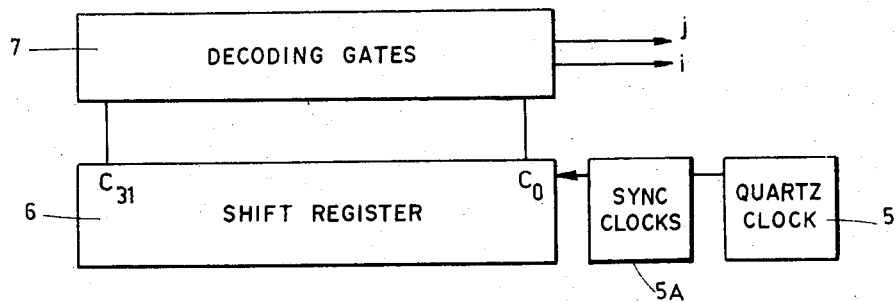

FIG. 3 diagrammatically shows the synchronizer and the set of gates associated therewith.

Figure 4:
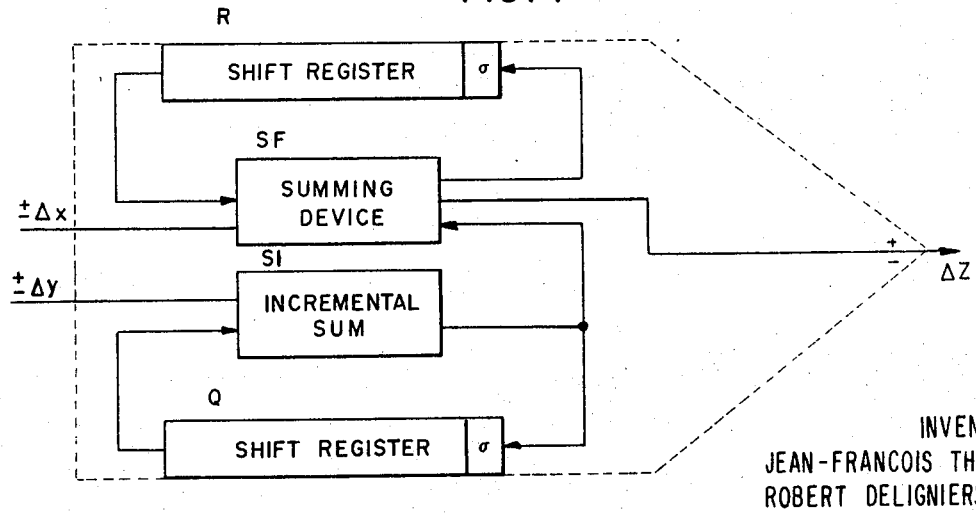

FIG. 4 diagrammatically shows a differential-digital analyzer.

Figure 5:
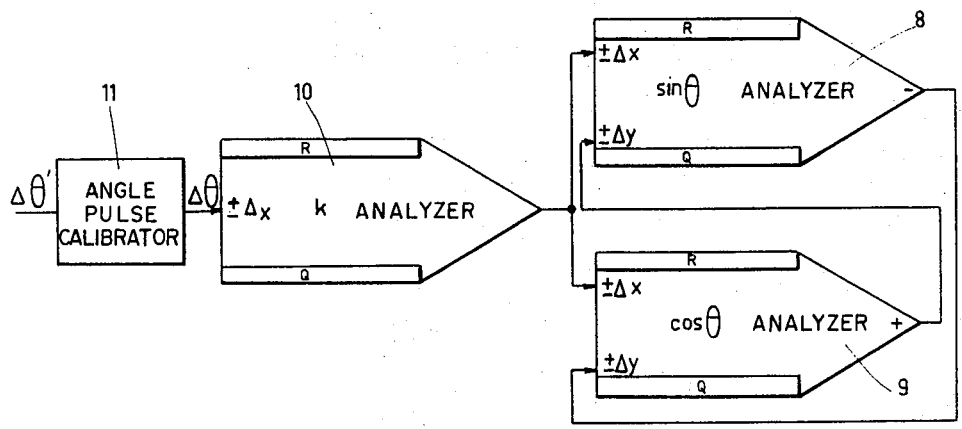

FIG. 5 is a diagram of the whole apparatus used for determining the variations of the sine and cosine values of the heading angle as a function of the variation increments of the latter.

Figure 6:
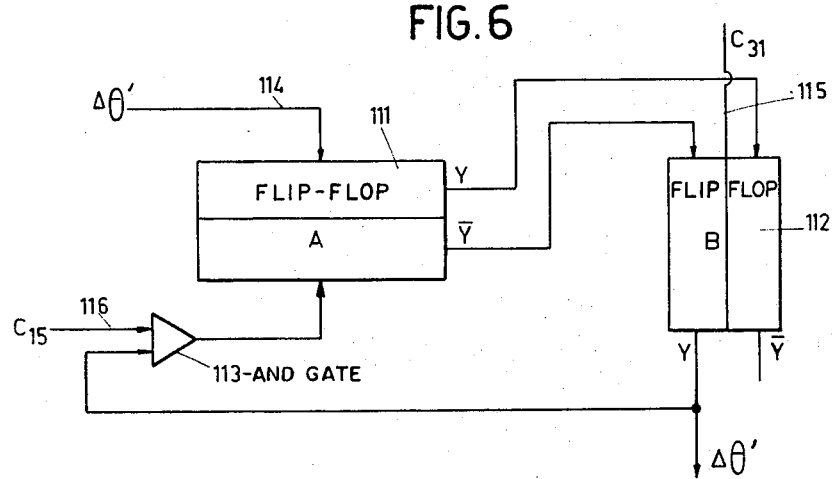

FIG. 6 shows a device for calibrating angle pulses.

Figure 7:
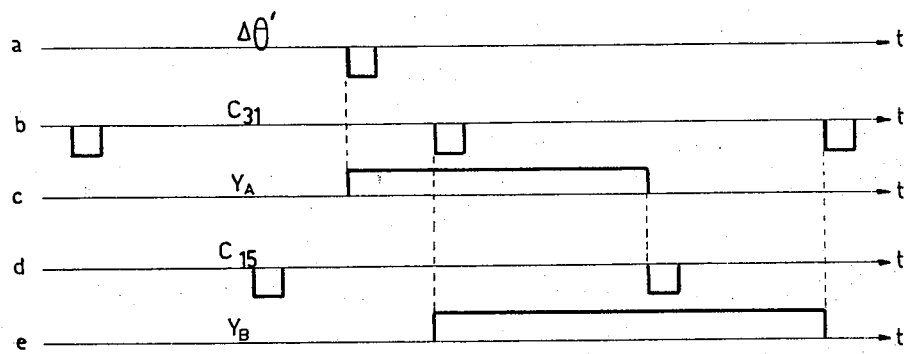

FIG. 7 shows chromograms of the pulses generated in the calibrating device.

Figure 8:
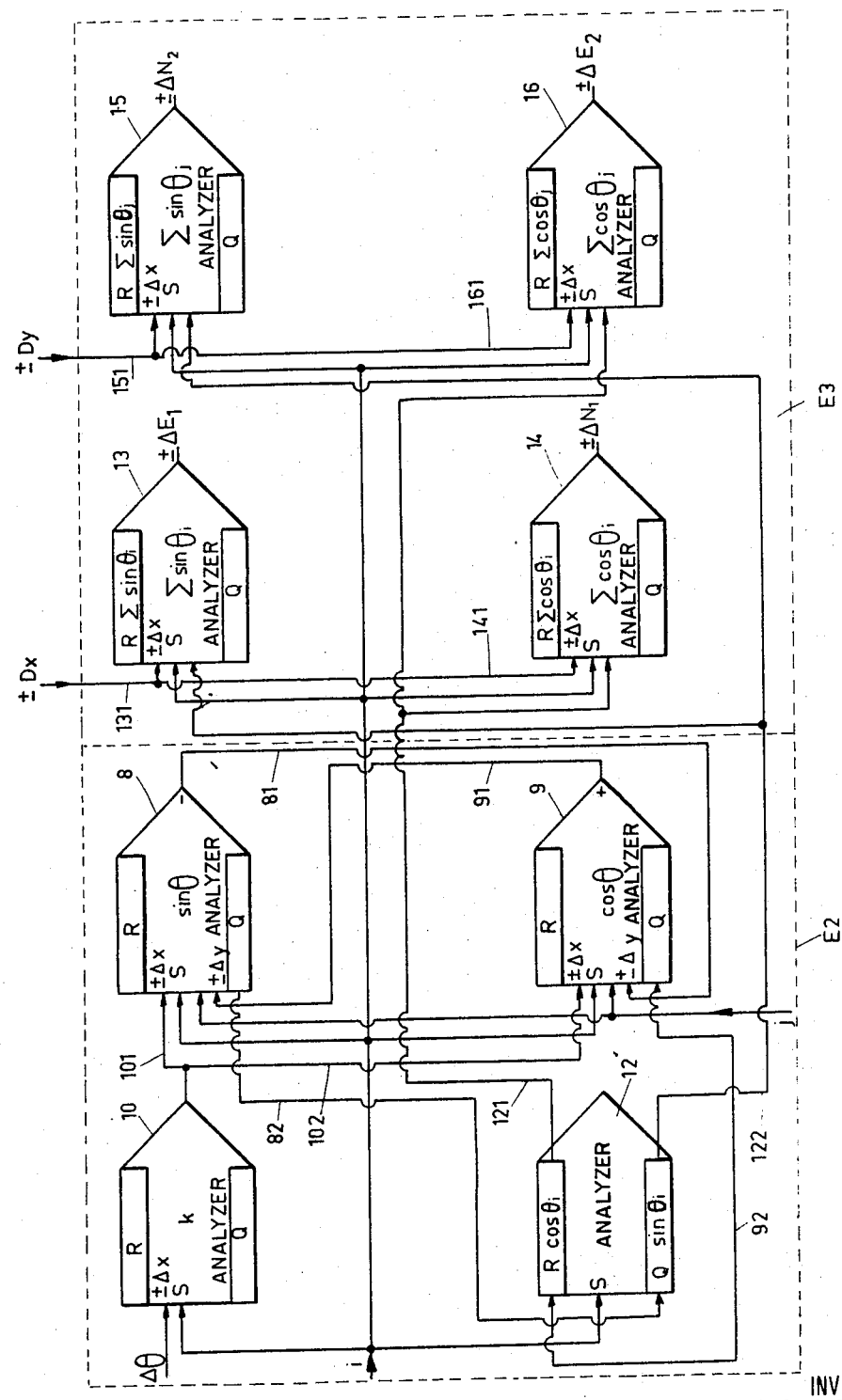
Figure 9:
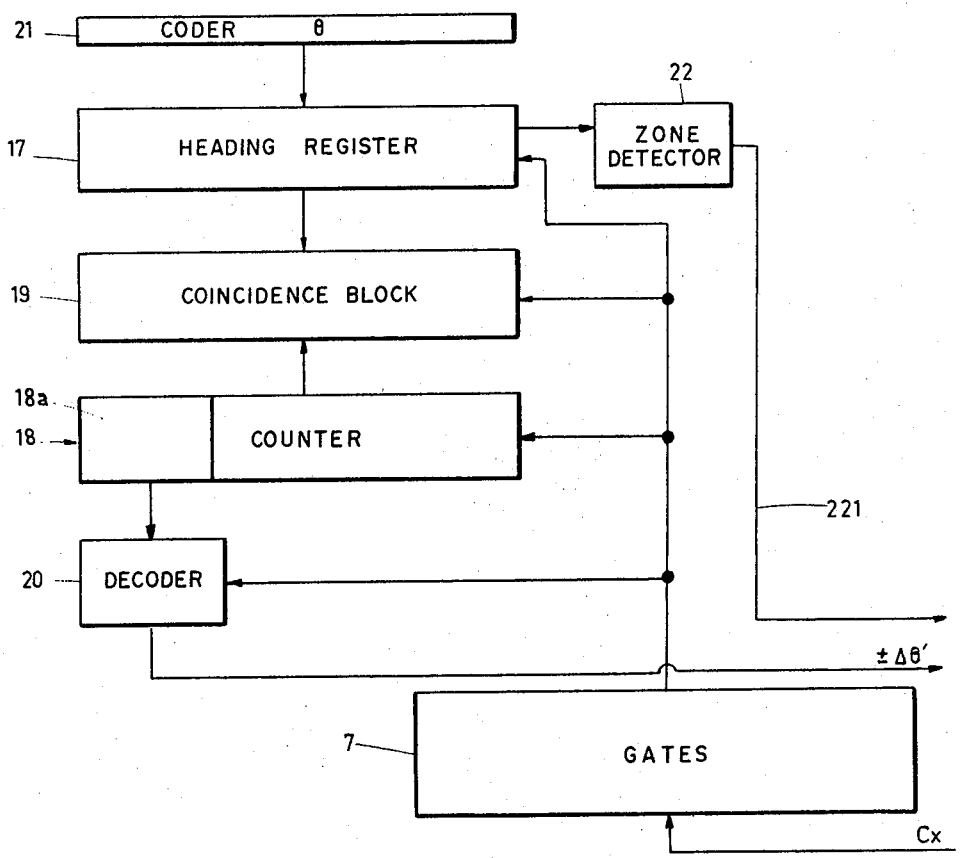

FIG. 8 diagrammatically shows devices for determining and memorizing the sine and cosine values of the heading angle as well as the devices for cumulating these values, and FIG. 9 diagrammatically shows the elements forming the angle increments generator.

Figure 1A:
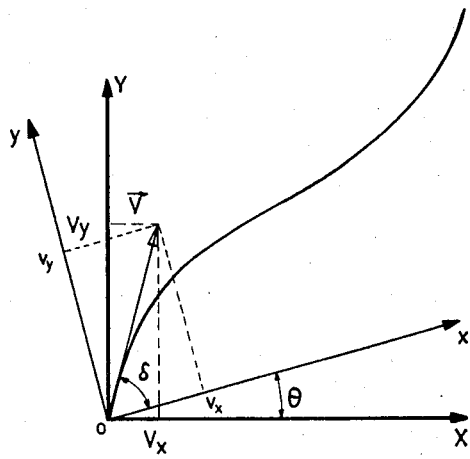
FIG. 1A is a geometrical representation of the travel path of the moving body in the most general case.
Figure 1B:
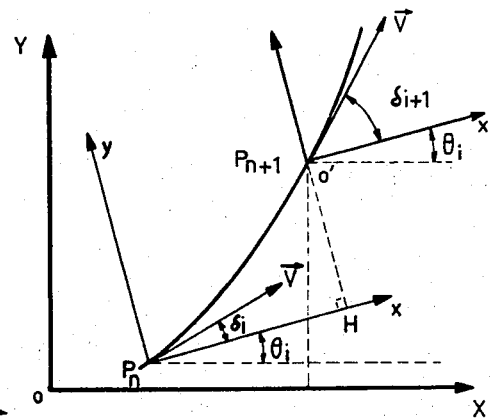
FIG. 1B is a geometrical representation of the travel path of the moving body when the angles formed between the axes are constant.

The method of the invention will be now described with reference to FIGS. 1A, 1B and 1C after a brief explanation of the relationships involved in a change of coordinate axes.

On FIG. 1A, the location of the moving body is given with respect to the stationary axes system (OX, OY) and also with respect to the axes system (Ox, Oy) associated with the moving body and hereinafter called the "related axes system". For example the axis Ox is oriented in the direction of the longitudinal axis of the vehicle.

The speed-vector of the vehicle is indicated by $\vec{V}$. Its projections on axes OX and OY are respectively indicated $V_x$ and $V_y$ and its projections on axes Ox and Oy are respectively indicated $v_x$ and $v_y$.

Let $\theta$ be the heading angle, i.e the angle between axes Ox and OX and $\delta$ the drift angle, i.e the angle between Ox and vector $\vec{V}$.

From the conventional relationships for coordinates changes:

$$V_X(t) = V_x \cos\theta - V_y \sin\theta, \text{ and} \quad (1)$$
$$V_Y(t) = V_x \sin\theta + V_y \cos\theta \quad (2)$$

giving the values of the speed-vector components in the stationary axes system with respect to the components of the same vector in the related axes system, the coordinates $X_f$ and $Y_f$ of the location of the vehicle at a time $t_f$ can be expressed as follows:

$$X_f = X_0 + \int_{t_0}^{t_f} V_x \cos\theta \, dt - \int_{t_0}^{t_f} V_y \sin\theta \, dt \qquad (3)$$

$$Y_f = Y_0 + \int_{t_0}^{t_f} V_x \sin\theta \, dt + \int_{t_0}^{t_f} V_y \cos\theta \, dt \qquad (4)$$

In the last two relationships $X_0$ and $Y_0$ indicate the coordinates of the vehicle at the starting time at which begins the determination of the travel path.

The navigation device located on the moving body generates, in the form of pulses, signals representing distance increments $D_x$ and $D_y$ along respective axes $Ox$ and $Oy$.

These increments are selected equal to $k\lambda$ wherein $k$ is an integer or a fraction and $\lambda$ is the wave length of the transmitted acoustic waves.

One important feature of the method consists of identifying successive instants $t_i$ and $t_j$ at which the counters of the navigation system record distance increments $D_x$ and $D_y$, respectively along axes $Ox$ and $Oy$. The time interval $t_0-t_f$ is subdivided into a series of elementary time intervals defined between two consecutive instants $t_i$ and two consecutive instants $t_j$, respectively along axes $Ox$ and $Oy$. The total displacements along axes $OX$ and $OY$ from the initial position, defined by $X_0$ and $Y_0$, to the position defined by $X_f$ and $Y_f$ may thus be considered as a succession of elementary displacements, each performed within one of the time intervals defined between two consecutive instants $t_i$ and $t_j$.

By this subdivision the relationships (3) and (4) may be written as follows:

$$X_f = X_0 + \sum_{t_i=t_o}^{t_f}\int_{t_i}^{t_{i+1}} V_x \cos\theta \, dt - \sum_{t_j=t_o}^{t_f}\int_{t_j}^{t_{j+1}} V_y \sin\theta \, dt \qquad (5)$$

$$X_f = X_0 + \sum_{t_i=t_o}^{t_f}\int_{t_i}^{t_{i+1}} V_x \sin\theta \, dt + \sum_{t_j=t_o}^{t_f}\int_{t_j}^{t_{j+1}} V_r \cos\theta \, dt \qquad (6)$$

wherein $t_i$ and $t_{i+1}$, on the one hand, and $t_j$ and $t_{j+1}$, on the other hand, are the successive instants of incrementation along respective axes $Ox$ and $Oy$.

Furthermore the relationships:

$$\int_{t_i}^{t_{i+1}} V_x \, dt = D_x \qquad (7)$$

$$\int_{t_j}^{t_{j+1}} V_y \, dt = D_y \qquad (8)$$

indicate that the distances travelled, respectively along axes $Ox$ and $Oy$ between instants $t_i$ and $t_i+1$ on the one hand and $t_j$ and $t_{j+1}$ on the other hand, are respectively equal to increments $D_x$ and $D_y$.

According to an important feature of the invention the displacement of the vehicle is assumed to be equal to the sum of a series of elementary rectilinear movements added to a sum of a series of elementary circular movements.

When the vehicle follows a travel path with a constant heading angle (FIG. 1B) the relationships (5) and (6) become appreciably simpler and in view of relationships (7) and (8) can be written as follows:

$$X_f = X_0 + \sum_{t_i=t_o}^{t_f} D_x \cos\theta_i - \sum_{t_j=t_o}^{t_f} D_y \sin\theta_j \qquad (9)$$

$$Y_f = Y_0 + \sum_{t_i=t_o}^{t_f} D_x \cos\theta_i + \sum_{t_j=t_o}^{t_f} D_y \cos\theta_j \qquad (10)$$

wherein $\theta_i$ and $\theta_j$ indicate the values of the heading angle at instants $t_i$ and $t_j$ respectively.

Figure 1C:
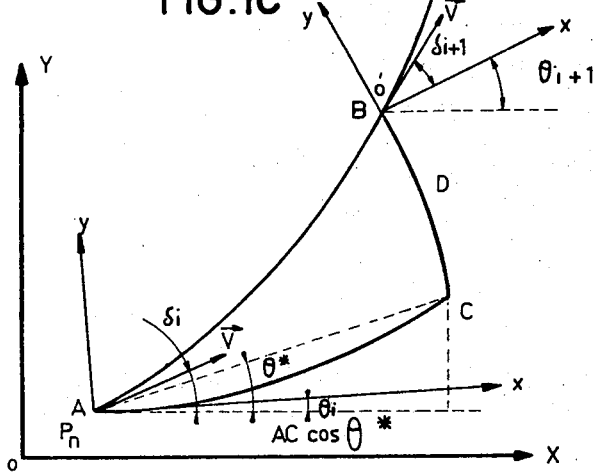
FIG. 1C is a geometrical representation of the travel path of the moving body when the angles formed between the axes are linear functions of time.

FIG. 1C shows the travel path AB of a vessel along a circle of radius $\rho$, between two instants $t_i$ and $t_{i+1}$ at which the counter for the displacement along axis $Ox$ of the navigation device counts an incremental unit. Let $\theta_i$ and $\theta_{i+1}$ be respectively the values of the heading angle at these two instants. The arc $\widehat{AC}$ represents the path travelled by the vehicle when the drift angle $\tau$ is zero.

On the figure it is apparent that:

$$\int_{t_i}^{t_{i+1}} V_x \, dt = \widehat{AC} = D_x \qquad (11)$$

and that $$\int_{t_i}^{t_{i+1}} V_x \cos\theta \, dt = \overline{AC} \cos\theta^* \qquad (12)$$

wherein $\overline{AC}$ is the chord subtense of arc $\widehat{AC}$ and $\theta^*$ is the angle between $\overline{AC}$ and the $OX$ axis, equal to $\theta_i + \Delta\theta/2$ with $\Delta\theta = \theta_{i+1} - \theta_i$.

Through simple geometrical considerations, the value of $\overline{AC}$ may be expressed in term of the radius of the turning circle of the vehicle, of the increment $D_x$ and of the angular difference $\Delta\theta$ due to the rotation.

The relationship (12) can thus be expressed in the form:

$$\int_{t_i}^{t_{i+1}} V_x \cos\theta \, dt = \frac{2D}{\Delta\theta} \sin\frac{\Delta\theta}{2} \cos\left(\theta_i + \frac{\Delta\theta}{2}\right) \qquad (13)$$

A more favorable representation in view of a further treatment is obtained by development of this relationship in the following form:

$$\int_{t_i}^{t_{i+1}} V_x \cos\theta \, dt = D_x \cos\theta_i - D_x \frac{\Delta\theta}{2} \sin\theta_i + \cdots \qquad (14)$$

Similarly, we have:

$$\int_{t_i}^{t_{i+1}} V_x \sin\theta \, dt = D_x \sin\theta_i + D_x \frac{\Delta\theta}{2} \cos\theta_i + \cdots \qquad (15)$$

Similar results are obtained in the case where the vehicle follows a circular path $\widehat{AB}$ with a turning radius $\phi$, in which case, between two instants $t_j$ and $t_{j+1}$, the counter for the displacement along axis $Oy$ of the navigational device counts an incremental distance unit $Dy$.

By geometrical determination of the length of chord $\overline{CB}$ in term of the radius $\phi$ of the turning circle, of the angular difference $\Delta\theta$ and of the increment value $Dy$, the following relationships are obtained:

$$\int_{t_j}^{t_{j+1}} V_y \sin\theta \, dt = D_y \sin\theta_j + D_y \frac{\Delta\theta}{2} \cos\theta_j + \cdots \qquad (16)$$

$$\int_{t_j}^{t_{j+1}} V_y \cos\theta \, dt = D_y \cos\theta_j - D_y \frac{\Delta\theta}{2} \sin\theta_j + \cdots \qquad (17)$$

In these relationships $\theta_j$ indicates the value of the heading angle at instant $t_j$.

The corresponding relationships, in the case where the vehicle follows a rectilinear path, are deduced from these four relationships (14), (15), (16) and (17) by nullifying the variations $\Delta\theta$ of the heading angle.

Using relationships (14), (15), (16) and (17), the relationships (5) and (6) can be written as a sum of simple terms:

$$X_f = X_0 + \sum_{t_i=t_o}^{t_f} D_x \cos\theta_i - \sum_{t_j=t_o}^{t_f} D_y \sin\theta_j - \sum_{t_i=t_o}^{t_f} D_x \frac{\Delta\theta}{2} \sin\theta_i -$$

$$\sum_{t_j=t_o}^{t_f} D_y \frac{\Delta\theta}{2} \cos\theta_j + \cdots \qquad (18)$$

$$Y_f = Y_0 + \sum_{t_i=t_o}^{t_f} D_x \sin\theta_i + \sum_{t_j=t_o}^{t_f} D_y \cos\theta_j + \sum_{t_i=t_o}^{t_f} D_x \frac{\Delta\theta}{2} \cos\theta_i -$$

$$\sum_{t_j=t_o}^{t_f} D_y \frac{\Delta\theta}{2} \sin\theta_j + \cdots \qquad (19)$$

The fact that displacement is considered as equivalent to a series of rectilinear and circular displacements, defined by the instants at which an incremental unit is added to the counter of displacement of the naviga coordinates changes. The final coordinates $X_f$ and $Y_f$ are obtained by adding to the initial coordinates a series of elementary displacement and correction terms which may be generated in a simple computer, from angle increments.

The number of correction terms required for measuring coordinates $X_f$ and $Y_f$ are dependent on the required degree of accuracy. An estimate of the magnitude of the $\Delta\theta$ first order corrections show that the same can be neglected in view of the degree of accuracy attainable in the estimate of the heading angle, provided that the distance increments $D_x$ and $D_y$ are selected small enough as compared to the vehicle size.

This simplification is justified in a large number of application fields, for which the travel path of the vehicle may be subdivided into a number of small segments. The heading angle $\theta$ is then considered as constant along each segment.

The incremental computing device, to be further described, performs a series of computations and sums in accordance with the simplified relationships:

$$X_f = X_o + \sum_{t_i=t_o}^{t_f} D_x \cos\theta_i - \sum_{t_j=t_o}^{t_f} D_y \sin\theta_j \quad (20)$$

$$Y_f = Y_o + \sum_{t_i=t_o}^{t_f} D_x \sin\theta_i + \sum_{t_j=t_o}^{t_f} D_y \cos\theta_j \quad (21)$$

wherein the angle $\theta$ is assumed constant over each of the small path segments. However the distance increments $D_x$ and $D_y$ along axes $Ox$ and $Oy$ of the vehicle, are chosen equal to the measuring unit, for sake of simplicity. These increments will be given the form of pulses controlling addition or subtraction according to their sign.

The method of the invention has been explained with reference to the case where the measuring values of the distance increments along two rectangular axes related to the vehicle were available. When on the contrary, the distance increments available are only those along one axis, the relationships to be used in the computing device can be readily deduced from relationships (18), (19), (20) and (21) by eliminating therefrom all the terms corresponding to the missing increment.

The method of the invention will be carried out by means of a computing device so designed as to determine the sine and cosine of the heading angle $\theta$ given by the angle coding apparatus and to accumulate the sums $\Sigma \sin\theta$ and $\Sigma \cos\theta$, according to the signs of the increments $D_x$ and $D_y$ from the navigation apparatus. This accumulation of sums results in a positive or negative increment as soon as they become greater than the unit.

According to FIG. 2, the computer comprises a synchronization block 1 which controls all the operations, a device 2 for computing the values of $\sin\theta$ and $\cos\theta$, a device 3 for computing the sums $\Sigma \sin\theta$ and $\Sigma \cos\theta$ by accumulating the values of $\sin\theta$ and $\cos\theta$ and which determines, from the distance increments $D$, the variations of the vehicle position, and a generator 4 producing, from the absolute value of the heading angle $\theta$, the angle increments $\theta$ used for the successive computations of $\sin\theta$ and $\cos\theta$.

FIG. 3 diagrammatically shows the synchronizer 1, comprising a quartz clock 5 oscillating at a frequency of 450 KHz and associated with a shift register 6 having 32 bits numbered from $C_0$ to $C_{31}$, transmitting, through 32 conductors, pulses shifted during time and reproduced periodically. Synchronizing clock circuit 5A, interposed between clock 5 and the register 6, control the progressive shift of the pulses over the whole length of the latter. The conductors connect the synchronizer to a set of decoding gates 7 whereby the pulses are mixed in OR gates so as to produce various information in series. The nature of this information will be specified later in connection with the description of devices 2 and 3 and of the increments generator 4.

The basic circuit of the computer is a binary incremental computer known as differential digital analyzer (DDA) of a conventional type, hereinafter referred to simply as "analyzer" the operating principle of which will be briefly reminded with reference to FIG. 4.

This circuit is adapted to the binary digital computation of the values of:

$$z(x) = \int_{x_0}^{x} y(x) dx$$

on the basis of discrete values of $y(x)$ corresponding to various values of $x$. The interval $x_o$, $x$ being subdivided by a series of points $x_i$, distant by a spacing $\Delta x_i$, at which $y(x)$ has the values $y_i$, the above expression $z(x)$ can be written:

$$z(x) \approx \sum_i y_i \Delta x_i$$

provided that the spacing $\Delta x_i$ be small enough.

This computation is performed in two stages.

In a first stage $y(x)$ is allowed to increase by an amount $\Delta y$ so as to follow the progression of $y(x)$. The amount $\Delta y$ is the increment of $y(x)$ and is so selected that $y$ does not change by more than $\Delta y$ when $x$ changes by the spacing $\Delta x$.

In a second stage $y_i$ is multiplied by $\Delta x$ and the sum $\Sigma y_i dx$ is made.

These two operations are summarized by the following relationships:

$$y_{n+1} = y_n + \Delta y \quad (22)$$
$$\sum_{n+1} y_i \Delta x = \sum_n y_i \Delta x + y_{n+1} \Delta x \quad (23)$$

wherein $n$ is an integer.

This first adding operation of the "serial" type is performed by means of an increments summing device SI in a loop with a shift register Q having the same length as the "word" y.

The increment $\Delta y$ is supplied to the first adder and added or substracted from the contents of register Q. The first bit ($\sigma$) is used for the sign and is followed with bits of decreasing value.

In order to perform the second operation $\Delta x$ is chosen equal to a power of 2, say $2^{-\alpha}$ (wherein $\alpha$ is a positive integer). The binary multiplication of $y_{n+1}$ by $2^{-\alpha}$, which corresponds to a shift by $\alpha$ rows towards bits of small values, results in a lengthening of the "word" $y_n \Delta x$ and subsequently requires the same lengthening of the register adapted to contain it.

Accordingly, it is necessary to multiply $y_n$ by a factor $\Delta X = 2^o = 1$ which will not result in a lengthening of the binary expression of $y_n \Delta x$. The term $\Delta X$ is deduced from $\Delta x$ by the relationship:

$$\Delta X = dx \cdot 2^\alpha \quad (24)$$

$\Delta X$ being equal to $\pm 1$, thus results in an order pulse of addition or of subtraction according to the sign of $\Delta x$.

The relationship (23) becomes: $\sum_{n+1} y_i = \sum_n y_i + y_{n+1}$ (25)

It is performed in a summing device SF in a loop with a shift register R comprising a bit for the sign followed with bits of decreasing values. The variation $\pm \Delta X$ is supplied to the summing device SF.

In view of the value of $\Delta X$, the output signal of the analyzer is multiplied by a factor $2\alpha$.

The numbers registered in the shift register are strictly limited to those lower than the unit. The negative numbers are registered in the form called "complement of two".

In order to take in consideration these maximum values, there are used scale coefficients, respectively $\gamma$ and $\epsilon$ applied to the values of $y$ and $z$, so that the functions $Y$ and $Z$ substituted therefor have absolute values lower than one.

The values of $y$, $z$ and $dz$ are then dependent on the values of $Y$, $Z$ and $dZ$ according to the relationships: $Y = y \cdot 2^\gamma$, $Z = z \cdot 2^\epsilon$, $dZ = dz \cdot 2^\epsilon$ wherein coefficients $\gamma$ and $\epsilon$ are so selected that Y and Z become lower than one, i.e.: $-1 < y \cdot 2^\gamma < 1$ and $-1 < z \cdot 2^\epsilon < 1$ The analyzer determines the value of $Z$ by making the product $Y \Delta X$.

The different coefficients are then related by the relationship:

$$\Delta z \cdot 2^\epsilon = \Delta y \cdot 2^\gamma \cdot \Delta X \cdot 2^\alpha \quad (26)$$

which relationship implies the following relationship between $\alpha$, $\gamma$ and $\epsilon$:

$$\epsilon = \alpha + \gamma \quad (27)$$

As soon as the register R exceeds its maximum capacity a so-called "saturation" pulse is transmitted to a so-called "polarized" output.

The register R may also be compelled to have a maximum capacity of an absolute value equal to ½ and to transmit a saturation pulse to a so-called "non-polarized" output, as soon as said capacity is reached. In this case, the scale coefficient $\epsilon$ is given a value:

$$\epsilon = \alpha + \gamma - 1 \quad (28)$$

The first computation stage of determining the values of $\sin \theta$ and $\cos \theta$ will be described with reference to FIG. 5 showing two analyzers 8 and 9 coupled to each other, the output of one analyzer being connected to the input indicated by $\pm \Delta y$ of the increments summing device of the other one and vice-versa.

Let $y_1(\theta)$ and $y_2(\theta)$ be the whole of the values of $\sin \theta$ and $\cos \theta$. The increments of $\sin \theta$ and $\cos \theta$ resulting from an increment $\Delta \theta$ of the heading angle, are given by the relationships:

$$\Delta y_1 = \cos \theta \Delta \theta \pm y_2(\theta) \Delta \theta \quad (29)$$
$$\Delta y_2 = -\sin \theta \Delta \theta = -y_1(\theta) \Delta \theta \quad (30)$$

The term $\Delta \theta$ must be made identical to $\Delta x$ in the general case.

In view of the above notations $\Delta z_1 X$ and $\Delta z_2$ will indicate respectively the values of the increments $y_1 \Delta \theta$ and $y_2 \Delta \theta$ given by the analyzers.

The increment $\Delta z_2 = y_2 \Delta \theta$ results to be, in view of relationship (29), nothing else than the increment $\Delta y_1$ of $y_1$. Similarly $-\Delta z_1 = -y_1 \Delta \theta$ is nothing else than the increment $\Delta y_2$ of $y_2$ in view of relationship (30).

These remarks justify the connections adapted to interconnect both analyzers. Each analyzer is provided with two output terminals whereon the available signals are in phase opposition.

On the negative output terminal of analyzer 8 is picked up an increment $-\Delta z_1 = \Delta y_2$ which is sent to the increments summing device S.I. and to the register Q associated with the analyzer 9, which perform the first summing operation defined by relationship (22).

The summing device S.F. and the associated register R perform the sum $\epsilon y_i \Delta \theta$ defined by relationship (23) and the analyzer (9) generates on the positive output terminal an increment $\Delta z_2 = \Delta y_1$. This increment is sent to the summing device S.I. of the analyzer (8) which add it to the recorded value in the register Q in accordance with relationship (22). A new computation cycle starts when the analyzers receive pulses corresponding to angle increments $\Delta \theta$.

As in the general case, scale coefficients are introduced. Since the desired accuracy of the values recorded in the register is of a hundredth of the unit, seven binary figures as necessary for representing them.

As the register capacity is strictly lower than the unit and the functions $\sin \theta$ and $\cos \theta$ reach this value, said two functions are multiplied by two coefficients, respectively $2^{\gamma_1}$ and $2^{\gamma_2}$ equal to $2^{-1}$. The contents of registers $Q_1$ and $Q_2$ will accordingly have 8 binary figures.

The increment $\Delta Z_1 = \Delta z_1 2^{\epsilon_1}$ results in a logic "1". Since it must be added to the eighth bit of register Q of analyzer 9, it has to be multiplied by $2^{-8}$. It is then equal to increment $\Delta y_2$ multiplied by the coefficient $2^{-1}$. This results in the relationship:

$$\Delta Z_1 = 2^{-8} = \Delta z_1 \cdot 2^{\epsilon_1} \cdot 2^{-8} = \Delta y_2 \cdot 2^{-1} \quad$$

wherein $\Delta z_1 = \Delta y_2$. It follows that $\epsilon_1 = 7$. For reasons of symmetry $\epsilon_2$ is given the same value.

There are used the non-polarized outputs of registers R. The coefficients $\epsilon$, $\alpha$ and $\gamma$ are interrelated as follows:

$$\epsilon_1 = \alpha + \gamma_1 - 1 \text{ and } \epsilon_2 = \alpha + \gamma_2 - 1$$

in accordance with relationship (28). With selected values of $\gamma_1$, $\gamma_2$, $\epsilon_1$ and $\epsilon_2$ it follows that $\alpha = 9$. Consequently $\Delta X$ must be equal to $\Delta \theta \cdot 2^9$.

In order that $\Delta X$ be reduced to a summing pulse, the the angle increments $\Delta \theta$ must have the value: $\Delta \theta = 2^{-9}$ i.e. $1.953 \times 10^{-3}$ radian.

The angle coder, which detects the heading angle, produces increments of a value $\Delta \theta' = 6'$ of arc, corresponding to $1.745 \cdot 10^{-3}$ rd.

The value of $\Delta \theta'$ has therefore to be adapted to the value of $\Delta \theta$ by multiplying it by a coefficient $k$ such that $\Delta \theta' = k \Delta \theta$.

In view of these values of $\Delta \theta$ and $\Delta \theta'$, $k$ is given the value:

$$k = 0.89345$$

The operation is carried out in an analyzer 10.

In practice there are used registers R with 16 bits. An input provides for the introduction in the registers of the initial conditions $\sin \theta_o$ and $\cos \theta_o$ in response to an order from synchronizer 1.

The synchronizer generates 32 pulses which repeat periodically. Let $\tau$ be the time interval between any two of these pulses and T be the cycle length equal to $32 \tau$.

The synchronizer controls the running of the "words" recorded on the registers Q and R of analyzers 8, 9 and 10, through the summing units S.I and S.F associated therewith.

By "running" is meant the fact that each figure is sent back through the summing unit onto the bit of highest weight when after successive shifts it has reached the bit of lowest weight. These runs in registers with 16 bits are performed over a time equal to $16 \tau$, i.e. half a cycle.

When the vehicle moves while keeping a steady heading it may however be subjected to small heading variations on both sides of its travel path as a result of the disturbing effects of its carrying medium (sea movements in the case of a marine vehicle). These slight variations may reach $1/10^{th}$ of a degree.

In order to avoid to record in the computer such small variations which have no useful significance, there are sent, on the input terminals of the analyzers with the reference $^+\Delta x$, increments equal to 12 feet of arc i.e 2/10 of a degree.

An increment $\Delta \theta'$ of 12' of arc produced by the increment generator 4 is supplied to a generator of adding or substracting orders which convert this increment into a calibrated logical square signal of a length T.

This calibrated signal $\Delta X'$ is fed to the analyzer (10) on its input $\pm \Delta X$. The analyzer (10) multiplies said signal by the coefficient $k$. But the duration of said order being $32 \tau$, i.e twice the turning period of a counter R, the analyzer 10, controlled by synchronizer 1 will perform its computation and will add it twice. All is the same as if the computation were affected from two successive angle increments, each of 6 feet of arc.

It has already been stated that, by introduction of the scale coefficient $\gamma$, the contents of the counters Q and R of the analyzers have an absolute value lower than ½. Accordingly the values computed by analyzers 8 and 9 correspond respectively to $\sin \theta/2$ and $\cos \theta/2$. The running period of the counters being half of a cycle, the synchronizer controls two successive computations during one cycle. The accumulated results of these two computations thus provide the values of $\sin \theta$ and $\cos \theta$.

From the 32 $Cx$ pulses produced by the synchronizer, there are generated in series a synchronization pulse, a pulse controlling addition on registers Q and the initial values $\sin \theta_o$ and $\cos \theta_o$.

Every 16 time units $\tau$, the words circulating through registers Q and R and analyzers 8, 9 and 10 being returned to their original position, the synchronizer orders the initiation of the next turn.

Said order is given by pulses $C_{15} + C_{31}$ through one OR gate of the gates block 7 of FIG. 3.

The increment unit produced by analyzer 8 is added to the height figure of the word contained in register Q of analyzer 9 when it appears in the associated summing unit S.I, on order given by the pulse generated at this time by the synchronizer, i.e either the pulse $C_7$ or the pulse $C_{23}$ through an OR gate of the gates block 7. Conversely the increment unit produced by analyzer 9 is added to the eight figure of the word recorded in register Q of adder 8 on an order from the same pulses.

The introduction of the initial conditions will be described in connection with the description of the increments generator 4.

The operation of the device for calibrating angle pulses 11, placed ahead of the analyzer (10) and shown in FIG. 6, will be described with reference to FIG. 7. A flip flop circuit A(111) has one of its input terminals connected to the increments generator 4 through conductor 114. Its output terminals Y and $\overline{Y}$ are connected to the input terminals of a flip flop circuit B (112) connected to the synchronizer through conductor 115. The output Y of flip flop 112 is connected to another input of flip flop 111 through an AND gate 113, controlled by the synchronizer through conductor 116.

An aleatory order $\Delta\theta'$ (FIG. 7 diagram a) produced by generator 4 triggers the flip flop to a state where $(Y_A) = 1$ and $(\overline{Y}_A) = 0$ (FIG. 7, diagram C).

The order $\Delta\theta'$, occurring for example between instants $C_{15}$ and $C_{31}$, the pulse $C_{31}$ transmitted through conductor 115 triggers the flip flop B(112) to the state where $(Y_B) = 1$ and $(\overline{Y}_B) = 0$ (FIG. 7 diagrams b and e). The following $C_{15}$ pulse (FIG. 7 diagram d) opens the AND gate 113 and triggers back the flip flop 111 to the state where $(Y_A) = 0$ and $(\overline{Y}_A) = 1$. This instant defines the end of the opening square wave (FIG. 7 diagram C). The flip flop (111) being in this state the following $C_{31}$ pulse triggers back flip flop B(112). This instant defines the end of the opening square wave of this flip flop (FIG. 7 diagram e).

Consequently, starting from an aleatory pulse $\Delta\theta'$ appearing in the course of a cycle, the device generates at output $Y_B$, a logic square signal over the length of a cycle T.

The computations relating to $\sin\theta$ and $\cos\theta$ can only be initiated at the beginning of a cycle although the pulse $\Delta\theta'$ occurred during the preceding cycle.

The second series of operations consisting in the summing $\Sigma \sin\theta_i$ and $\Sigma \cos\theta_i$ will be described with reference to FIG. 8.

This figure shows the assembly of the analyzers used for performing the various series of computation, forming two computation devices 2 and 3.

The assembly 2 comprises the above described analyzers 8, 9 and 10.

The output of analyzer 10, producing calibrated increments $\Delta\theta$, is connected to the inputs with references $\pm\Delta X$ of analyzers 8 and 9, through connections 101 and 102. The negative output of analyzer 8 is connected to the input $\pm\Delta Y$ of analyzer 9 through conductor 81. The positive output of analyzer 9 is connected to the input $\pm \Delta Y$ of analyzer 8 through connection 91.

Device 2 further comprises an analyzer 12 used as memory. Registers Q of analyzers 8 and 9 are respectively connected to registers Q and R of analyzer 12. At the end At the end of each cycle of computation of $\sin\theta$ and $\cos\theta$, the increments generator 4 issues a signal for storing in a memory the computed $\sin\theta_i$ and $\cos\theta_i$.

A connection indicated by i, with the inputs, indicated by S, of the different analyzers, provides for the transmission of the order of synchronized circulation of the words contained in registers Q and R, through their respective summing devices S.I and S.F.

Synchronizer 1, issues, through the conductor indicated as j and connected to the summing devices S.I of analyzers 8 and 9, a pulse ordering the summing of the produced increments with the contents of registers Q at the beginning of the cycle which immediately follows the occurrence of an angle increment $\Delta\theta'$.

In the computation assembly 3 the summing devices are arranged in groups.

Let $\Delta N$ and $\Delta E$ be respectively the differences $X_f - X_o$ and $Y_f - Y_o$. The relationships (20) and (21), with the use of the notations $\Delta N_1, \Delta N_2, \Delta E_1, \Delta E_2$, become:

$$\Delta N = \sum_i D_x \cos\theta_i - \sum_j D_y \sin\theta_j = \Delta N_1 - \Delta N_2$$

$$\Delta E = \sum_i D_x \sin\theta_i + \sum_j D_y \cos\theta_j = \Delta E_1 = \Delta E_2$$

In these relationships $\Delta_i$ and $\Delta_j$ are the values of the heading angle $\theta$ upon arrival of the respective distance increments $D_x$ and $D_y$ produced by the navigation device.

These summing operations are carried out in the summing devices S.F of the four analyzers having references 13, 14, 15 and 16 and are recorded on the associated registers. The analyzers 13, 14, 15 and 16 produce respectively the partial sums $\Delta E_1, \Delta N_1, \Delta N_2$ and $\Delta E_2$.

The registers R and Q of analyzer 12 are respectively connected through conductors 121 and 122, to analyzers 14 and 13 on the one hand and to analyzers 16 and 15 on the other hand.

Through conductors 131 and 141 on the one hand and conductors 151 and 161 on the other hand, connected to inputs $\pm\Delta x$ respectively of adders 13 and 14 on the one hand and 16 and 17 on the other hand, arrive the pulses corresponding to the distance increments, respectively $\pm D_x$ and $\pm D_y$, produced by the navigation device.

The connection indicated by i which also leads to the inputs S of analyzers 13, 14, 15 and 16 conveys the order of synchroneous circulation of the words recorded on the registers.

The registers R of analyzers 13, 14, 15 and 16 have a maximum capacity lower than the unit.

When the sums:

$$\sum_i D_x \cos\theta_i = \Delta N_1, \sum_i D_y \sin\theta_i = \Delta N_2,$$

$$\sum_j D_x \sin\theta_i = \Delta E_1 \text{ and } \sum_j D_y \cos\theta_j = \Delta E_2$$

will reach this value, a saturation pulse will be produced. A generator of addition or subtraction orders, similar to generator 11, not shown, calibrates the aleatory pulses $\pm Dx$ and $\pm Dy$ over the cycle length.

The arrival of a square wave $\pm Dx$ calibrated over a cycle period, allows the addition or subtraction of the values recorded in registers R and Q of analyzer 12, to the respective values recorded in registers of analyzers 14 and 13.

Similarly the arrival of a square wave $\pm Dy$ allows the addition or subtraction of the values recorded in registers R and Q of analyzer 12, to the respective values recorded in registers R of analyzers 16 and 15.

The summing of $\Delta N_1$ and $\Delta N_2$ on the one hand and of $\Delta E_1$ and $\Delta E_2$ on the other hand, provides the increments of the vehicle displacement in a geographical axes system.

When distance increments are only available on a single axis, e.g $\pm Dx$, the device 3 is limited to two analyzers 13 and 14.

The generator of heading angle increments will be described with reference to FIG. 9. It comprises a heading register (17) consisting of four decimal counters in series one for the hundreds of degrees, a second for the tens, a third for the units and a fourth for the tenths of degree, a binary counter coded in decimal system BCD 18, comprising three decimal counters, one for the tens of degrees, a second for the units, a third indicated 18a for the tenth of degree, a coincidence block (19) interposed between register (17) and counter (18) and a decoding system 20 connected to counter 18a.

All the operations carried out by the generator of heading angle increments are controlled by two shifted pulses, produced by the synchronizer (1) during a cycle T, through the block of control gates 7.

At the beginning of each determination of $\sin\theta$ and $\cos\theta$, the value of the heading angle given by coder 21 is blocked in register 17.

For detecting the values set up on the two bits of low weight of the counter of hundreds of degrees of this register, it is determined the angular zone (0,100°), (100°, 200°), (200°, 300°) or (300°, 360°) in which is included the heading angle value. This operation is performed by a zone detector 22. It generates a signal which initiates the registers of the adders at values of $\sin\theta$ and $\cos\theta$ corresponding to the lower limit of the detected angular zone.

A each cycle a pulse increases by one unit, i.e by 6 feet of arc, the total of counter 18a. Counter 18 records and sums up all the pulses until its contents becomes equal to that of register 17. This equality is detected by the coincidence block 19. The decoding system 20, connected to the calibrating device 11, issues increments of 12 feet of arc at each time when the counter 18a indicates a total which is a multiple of this value.

The issue of increments $\Delta\theta'$ of 12 feet of arc, which determines the advance of the computation of sin $\theta$ and cos $\theta$ in the counters, is stopped when the values set up in register 17 and in counter 18 are identical.

The coordination of the various logic operations, carried out by the computation device, is performed by starting from pulses $C_x$, through the block of gates 7 the operation of which will be now described.

The pulse $C_2$ blocks the value set up by register 17 when a computation sequence is not in operation. After having carried out the detection of the angular zone including the heading angle value, the pulse $C_4$ generates a signal which initiates the computation of sin $\theta$ and cos $\theta$ at values corresponding to the lower limit of said zone.

After adjustment of the values of sin $\theta$ and cos $\theta$ in the registers of the adders, the pulse $C_6$ generates a signal A by actuation of a flip flop. The presence of this signal allows the evolution of the computations.

The pulse $C_8$ (RAZ) restores to its initial condition (zero) the coincidence block 19 at the beginning of the calculation period, i.e. after the signal A has been generated by the preceding pulse. The coincidence block is then tested in order to decide stopping of the calculation, in case of coincidence between the values set up in register 17 and in counter B.C.D 18, starting from pulse $C_{10}$ and signal A.

If this test is negative, i.e in case of non-coincidence, the block 19 is at a "zero" state. In the opposite case it is at a "one" state which results in the cancelling of signal A by order from pulse $C_{12}$.

The pulse $C_{14}$ causes the advance of the figure recorded on the counter provided that the signal A, allowing the continuation of the operations, be generated.

The values which are odd multiples of 6 feet of arc, set up in counter 18a, are unnecessary, since they do not result in the issue of an increment $\Delta\theta$. When the pulse $C_{14}$ has caused the advance of the number set up in counter 18a, up to an odd value, the pulse $C_{16}$ orders the recording of a new unit of 6 feet of arc.

The pulse $C_{16}$ controls the creation, by a flip flop circuit, of a signal $A_1$ allowing this further counting. This signal $A_1$ permits, on the one hand, to test the decoding system 20 and, on the other hand, to test the coincidence block 19 for the case where this further counting produces a coincidence between the respective contents of register 17 and counter 18. When the signal $A_1$ is generated, the pulse $C_{18}$ causes the advance of the number set up in counter 18, if the test of block 19 is negative (i.e. if block 19 is at a "zero"state).

The pulse $C_{20}$ cancel the signal $A_1$ and order the resetting to zero of counter 18 in case where computation is completed. At the same time, decoding system 20 is tested in order than an increment $\Delta\theta$ be emitted if the computation is progressing.

The pulse $C_2O$ also controls the storage in the memory 12 of the values of sin $\theta$ and cos $\theta$ when the computation is complete (A=O).

The computer according to this invention, as hereabove described, may be placed onboard a ship adapted for seismic prospecting on sea and thus provides means for determining at any moment with accuracy its position or its travel path. It may also be placed onboard of a submarine craft and use as course surveyer.

It may also be used for example for controlling the automatic pilot of a vessel having to be maintained at a determined position.

The above examples, being given for illustrative purpose only, must by no way be considered as limiting the use of the computer in connection with the only marine vehicles.

More generally it can be used for determining the position and the travel path of any moving body with respect to stationary axes.

What is claimed is:

1. A coordinate converting device for the determination of the coordinates of a moving body with respect to a pair of stationary coordinate axes, the value of the angle between one of the stationary axes and one of the axes of a pair of a coordinate axes being related to the moving body and the value of the distance travelled by the moving body in the direction of at least one of the axes of the coordinate axes related thereto being known, said distance being in the form of a series of distance increments, comprising:

first means for calculating the sin and cos of said angle from the variations of said angle, said first means having a first plurality of binary incremental computers connected in a closed circuit arrangement, the outputs of each computer being connected to the inputs of the other computer, respectively;

second means, responsive to the values of said angle, for coding said values in digital form;

third means, responsive to the output of said second means, for inhibiting the output of said second means at the beginning of each calculation of the sin and cos of the angle;

fourth means for producing a plurality of pulses at regular timed intervals;

fifth means, responsive to said pulses, for counting said pulses recurring within a regular period;

sixth means, responsive to the output of said third means and said fifth means, for detecting the equality between the digital value of said angle and the number of counted pulses;

seventh means, responsive to the output of said fifth means, for producing pulses at time intervals proportional to the length of said regular periods up to the establishment of said equality, said pulses corresponding to increments of said angle;

eighth means, responsive to the output of said seventh means, for calibrating said angular increments over the length of said regular periods, the output of said eighth means being connected to said first means;

ninth means, responsive to the successive values of said sin and cos of said angle for storing said successive values at the end of each regular period;

tenth means, responsive to the output of said ninth means, for multiplying said stored values of the sin and cos of said angle by said distance increments, including a second plurality of binary incremental computers, calibrated over a length of time equal to that of said regular periods; and eleventh means, connected to each of said first through tenth means, for controlling the sequential operation carried out thereby.

2. A device according to claim 1, further including an additional binary incremental computer coupled between the output of said eighth means and said first plurality of binary incremental computers, for analyzing the value of said angular increments.

3. A device according to claim 1, wherein the total sector of variation of said angle is divided into angular zones, and wherein said device further comprises a detection element responsive to the output of said third means, for determining the zone in which the value of the angle is included in controlling the adjustment of the sin and cos values of the angle to those corresponding to a prescribed lower limit of said angular zone.

4. A device according to claim 1 wherein said seventh means comprises a unit for producing pulses which are repeated at a period which is twice that of said regular periods and wherein said eleventh means comprises units for producing pulses for control of a double calculation operation of the sin and cos of the angle, during each of said regular periods.

5. A device according to claim 4, wherein the total sector of variation of said angle is divided into angular zones, and wherein said device further comprises a detection element responsive to the output of said third means, for determining the zone in which the value of the angle is included in controlling the adjustment of the sin and cos values of the angle to those corresponding to a prescribed lower limit of said angular zone.

6. A device according to claim 5, further including an additional binary incremental computer coupled between the output of said eighth means and said first plurality of binary incremental computers, for analyzing the value of said angular increments.

* * * * *